United States Patent [19]

Funada et al.

[11] Patent Number: 4,921,633

[45] Date of Patent: May 1, 1990

[54] METHOD OF HETEROGENEOUS REACTION

[75] Inventors: Tadashi Funada, Hyogo; Jiro Hirano, Kanagawa; Shiro Ishida; Kensuke Morioka, both of Hyogo; Sachiko Murakami, Osaka, all of Japan

[73] Assignee: Nippon Oil and Fats Co., Ltd., Tokyo, Japan

[21] Appl. No.: 902,010

[22] Filed: Aug. 28, 1986

Related U.S. Application Data

[63] Continuation of Ser. No. 596,790, Apr. 4, 1984, abandoned.

[30] Foreign Application Priority Data

Apr. 4, 1983 [JP] Japan ................................. 58-57839

[51] Int. Cl.$^5$ .............................................. B01J 13/02
[52] U.S. Cl. ..................................... 252/314; 252/356; 264/4; 264/4.1; 264/4.4; 264/4.7; 210/510.1; 210/503; 260/415; 435/134; 435/271; 422/256
[58] Field of Search ................... 252/314, 356; 264/4, 264/4.1, 4.4, 4.7; 210/510.1, 503; 260/415; 435/134, 271; 422/256

[56] References Cited

U.S. PATENT DOCUMENTS

| | | | |
|---|---|---|---|
| 2,313,692 | 3/1943 | Winer | 260/415 |
| 2,485,779 | 10/1949 | Sanders | 260/415 |
| 2,884,375 | 4/1959 | Seelig | 252/314 X |
| 3,480,616 | 11/1969 | Osipow | 536/119 |
| 3,900,420 | 8/1975 | Sebba | 252/314 X |
| 4,201,691 | 5/1980 | Asher | 252/314 |
| 4,278,544 | 7/1981 | Takashima | 210/510.1 |
| 4,317,743 | 3/1982 | Chang | 264/4.1 X |
| 4,356,109 | 10/1982 | Saeki | 264/4.1 |
| 4,377,344 | 3/1983 | Hentschel | 252/314 X |
| 4,380,503 | 4/1983 | Koerner et al. | 252/314 |
| 4,412,959 | 11/1983 | Wegner | 264/4.1 |
| 4,618,348 | 10/1986 | Hayes et al. | 252/356 |

FOREIGN PATENT DOCUMENTS 0120285 2/1984 European Pat. Off. .
345068 11/1956 Switzerland .

*Primary Examiner*—Richard A. Schwartz
*Assistant Examiner*—Catherine S. Kilby Scalzo
*Attorney, Agent, or Firm*—Sughrue, Mion, Zinn, Macpeak & Seas

[57] ABSTRACT

A method of heterogeneous reaction is described, comprising reacting a water-soluble component and an oil-soluble component dispersed in the water-soluble component or an aqueous medium containing the same. This dispersion is attained by passing the oil-soluble component through the micropores of a hydrophilic material as it is introduced into the aqueous medium. This hydrophilic material can be shaped into a desired form such as a membrane and a fabric. The flow rate, reaction rate and conversion are easy to control in the present method since the particle size of the oil-soluble component can be appropriately controlled. Furthermore, the present method does not need any stirring power nor an emulsification operation, and thus is advantageous from an economic standpoint.

22 Claims, No Drawings

METHOD OF HETEROGENEOUS REACTION

This is a Continuation of application Serial No. 596,790, filed Apr. 4, 1984, now abandoned.

FIELD OF THE INVENTION

The present invention relates to a method of carrying out a heterogeneous reaction and more particularly to a method of reacting an oil-soluble component with a water-soluble component in a heterogeneous sytem.

BACKGROUND OF THE INVENTION

In the heterogeneous reaction of an oil-soluble component with a water-soluble component, a stirring method using power, an emulsification method using surface active agents, a critical reaction method under high-temperature and high-pressure conditions, and so forth have heretofore been employed in order to obtain uniform mixing of the reactants. These methods, however, have various disadvantages, such as consumption of significant energy for the stirring operation or for maintaining high-temperature and high-pressure conditions, danger involved in realizing the high-temperature and high-pressure conditions, and a need to break emulsions after the completion of the reaction.

SUMMARY OF THE INVENTION

As a result of extensive investigations to develop a method for heterogeneous reactions which overcomes the above-described problems, it has been found that if an oil-soluble component is dispersed into a water-soluble component or an aqueous medium containing a water-soluble component by passing the oil-soluble component through micropores as it enters the aqueous medium, the particle size of the oil-soluble component can be controlled and the reaction is then able to proceed in an efficient manner.

In a preferred embodiment, the present invention relates to a method of heterogeneous reaction which comprises reacting an oil-soluble component with a water-soluble component while allowing the oil-soluble component to fall or rise in the water-soluble component or its aqueous solution owing to a difference in specific gravity between the oil-soluble component and the water-soluble component or its aqueous solution which method is characterized in that the oil-soluble component is dispersed into the water-soluble component or its aqueous solutionn by passing the oil-soluble component through micropores of a hydrophilic material.

A more specific object of this invention is to provide a heterogeneous reaction system in which an oil-soluble dispersed reaction component is efficiently dispersed within a stationary phase of a water-soluble reaction component.

Other objects of the invention will be apparent to the skilled artisan from the Detailed Description of the Invention, hereinbelow.

DETAILED DESCRIPTION OF THE INVENTION

In accordance with the present invention, a column, for example, is filled with a water-soluble component or its aqueous solution, and an oil-soluble component is introduced into the column from either the top thereof or the bottom depending on the specific gravity thereof, in a manner so that the oil-soluble component enters into the water-soluble component or its aqueous solution in a dispersed form. More specifically, the oil-soluble component is introduced into the water-soluble component or its aqueous solution through a dispersion apparatus (hereinafter referred merely as a "disperser") made of a hydrophilic material having micropores and as a result passes through the water-soluble component or its aqueous solution in the form of fine, minute droplets.

Hydrophilic materials which can be used in the fabrication of the disperser as used herein include hydrophilic organic materials such as polyvinyl alcohol, polyvinyl formal, polyvinyl acetic acetal, polyvinyl acetal, cellulose, acetyl cellulose, nitro cellulose, acetyl butyl cellulose, ethyl cellulose, methyl cellulose, benzyl cellulose, polypeptide, agar, carrageenan, gelatin, etc.; hydrophilic inorganic materials such as glass, gypsum, cement, alumina, silica gel, asbestos, etc.; natural fibers such as cotton, kapok, linen, ramie, hemp, jute, Manila hemp, sisal, New Zealand hemp, coir, mahair, cashmere, goat hair, camel hair, vicuna wool, alpaca hair, lama hair, horse hair, silk, etc.; and manufactured fibers such as viscose rayon, cuprammonium rayon, polynosic rayon, casein, etc. These hydrophilic materials can be used in admixture with lipophilic materials, or in a state that they are attached onto the surface of lipophilic materials.

The disperser as used herein may be fabricated in various forms such as a membrane, or plate, or gel or other layer-formed structure made of the hydrophilic material described above, or in the form of an interwoven or knit fabric (constructed fabric) or non-woven fabric structure made of threads of the hydrophilic material. It is preferred for the disperser to have micropores having a diameter of from 0.005 to 5 mm, more preferably from 0.01 to 1 mm. The oil-soluble component is dispersed into the water-soluble component or its aqueous solution by means of the abovedescribed disperser and then is allowed to rise or fall through the water-soluble component or its aqueous solution owing to the difference in specific gravity between the two components.

With regard to conditions under which the method of the present invention is carried out, the temperature, pressure and so forth can be appropriately determined depending on the disperser, column, reaction materials, catalyst, and so forth. The reaction temperature is usually from 10 to 150° C., and the reaction pressure may be atmospheric, subatmospheric or superatmospheric pressure. A catalyst can be used in the following manner: it is dissolved in any one of the water-soluble component and the oil-soluble component, or in the case of an insoluble catalyst such as a solid catalyst and a catalyst absorbed or immobilized onto a support, it is packed in the column, singly of in combination with a packed material, so that it can easily come into contact with the reaction materials.

The water-soluble component or its aqueous solution as used herein includes substances such as water, methyl alcohol, ethyl alcohol, ethylene glycol, propylene glycol, glycerol, neopentyl polyol, sucrose, glucose, and sorbitol, their aqueous solutions, and aqueous solutions of various other organic or inorganic substances such as monoethanolamine, diethanolamine, triethanolamine, monoisopropanolamine, diisopropanolamine, triisopropanolamine, ammonia, hydrogen peroxide, bromine, iodine, hydrochloric acid, hydrobromic acid, hydroiodic acid, sulfuric acid, nitric acid, etc. The oil-soluble components includes aliphatic carboxylic acids having at least 6 carbon atoms, aliphatic hydrocarbons having at least 6 carbon atoms, aromatic compounds containing at least 6 carbon atoms, natural animal or vegetable oils and fats, and various synthetic glycerides. In addition, esters such as methyl oleate, methyl palmitate, ethyl stearate, oleyl oleate, sorbitan trioleate, and sucrose fatty acid esters can be used.

It should be noted that the above-stated examples of oil-soluble and water-soluble reaction components are presented by exemplification only and the skilled artisan will be able to readily select other reactive components to be used in the heterogeneous reaction system disclosed herein, for example, the many different types of reactants which can participate in the types of heterogeneous reactions disclosed hereinbelow.

The method of the present invention produces various advantages. For example, since the particle size of the oil-soluble component can be controlled by means of the disperser made of the hydrophilic material, the flow rate, reaction rate, and conversion are easy to control. Furthermore, since the method of the present invention does not need stirring power nor an emulsification operation, and further can be performed continuously it can be suitably used in a wide variety of heterogeneous reactions utilizing an oil-soluble component and water-soluble component, such as esterification, ester exchange, hydrolysis, oxidation, reduction and addition.

Usually, in the practice of the present invention, the size of the oil droplets as introduced into the water-soluble component or its aqueous solution is about 0.005 to 5 mm, preferably about 0.01 to 1 mm and, most of the oil droplets stay with the same size during the reaction.

The present invention is described in detail with reference to the following examples.

EXAMPLE 1

Glycerol containing 2% by weight of sulfuric acid was used to fill a cylindrical glass vessel (height: 100 cm; inner diameter: 3 cm) and was maintained at 150° C. Fifty grams of oleic acid (purity: 9%) was introduced into the vessel from the bottom thereof through a 5 mm thick gypsum plate having a number of micropores of diameter of about 0.3 mm in the form of oil droplets having a particle size of from 0.5 to 1 mm, and was allowed to rise through the vessel at a space velocity of $5.7 \times 10^{-2} hr^{-1}$. An esterification reaction product, which floated on the top of the reaction mixture, was recycled. The reaction was carried out for 200 minutes (reaction product as recycled 10 times). The conversion of esterification as determined by the equation as described below as 90%.

$$\text{Conversion of Esterification} = \frac{\text{Acid value before reaction} - \text{Acid value after reaction}}{\text{Acid value before reaction}} \times 100$$

Fifty grams of glycerol containing 2% by weight of sulfuric acid and 50 g of oleic acid (purity: 99%) were placed in a 300 ml flask and esterified at 130° C. while stirring. The time required until the conversion of esterification reached 90% was 350 minutes, which is about 1.8 times that of Example 1. That is, in this example, the time as long as about 1.8 times that of Example 1 was needed to attain the same conversion of esterification as in Example 1.

EXAMPLE 2

Methyl alcohol containing 2% by weight of potassium hydroxide was used to fill the same cylindrical vessel as used in Example 1 and was maintained at 45°–50° C. Olive oil (acid value: 0.3; saponification value: 192) was introduced into the vessel from the top thereof through an about 2 mm thick cotton fabric in the form of oil droplets having a particle size of from 0.5 to 0.7 mm and was allowed to fall at a space velocity of $5.7 \times 10^{-2} hr^{-1}$. The methyl alcohol and olive oil reacted with one another. The reaction product precipitated and was recycled 6 times. Gas chromatography analysis showed that 90% of the olive oil was converted into the fatty acid methyl ester thereof.

EXAMPLE 3

The procedure of Example 2 was repeated wherein the cotton fabric was replaced by an about 1 mm thick acetyl cellulose membrane having a number of micropores of diameter 0.05–0.1 mm. The particle size of the oil droplets was 0.3–0.5 mm and the space velocity was $3.5 \times 10^{-2} hr^{-1}$. The reaction product was recycled four times. The yield of fatty acid methyl ester was 95%.

EXAMPLE 4

An aqueous lipase solution (500 unit/ml) was used to fill the same cylindrical vessel as used in Example 1 and was maintained at 35° C. Olive oil (acid value: 0.3; saponification value: 192) was introduced into the vessel from the bottom thereof through a 1 cm thick agar gel having a number of micropores of diameter about 0.2 mm in the form of oil droplets having a diameter of 0.3–0.5 mm, and was allowed to rise through the vessel at a space velocity of $4.5 \times 10^{-2} hr^{-1}$, whereby the olive oil and the water reacted with one another using the lipase. The reaction product, found floating on the top of the reaction mixture, was recycled. After the reaction product was recycled seven times, the conversion of hydrolysis was 93%.

$$\text{Conversion of hydrolysis} = \frac{\text{Acid value}}{\text{Saponification value}} \times 100$$

EXAMPLE 5

The procedure of Example 4 was repeated except the agar gel was replaced by an about 2 mm thick alumina plate having a number of micropores of diameter 0.15–0.2 mm and an aqueous lipase solution (1,000 unit/ml) was used. The particle size of the oil droplets was 0.2–0.3 mm and the space velocity was $4 \times 10^{-2} hr^{-1}$.

The reaction product was recycled five times. The conversion of hydrolysis of olive oil was 95%.

EXAMPLE 6

A cylindrical vessel (height: 150 mm; inner diameter: 15 mm) was charged with 25 ml of an immobilized enzyme prepared by adsorbing 0.1 g of lipase onto oxirane-acrylic beads (produced by Röhm Pharma GMBH, West Germany) and water. Olive oil was introduced into the vessel from the bottom thereof through the same cotton fabric as used in Example 2 and was allowed to rise through the vessel at a space velocity of $2 \times 10^{-3} hr^{-1}$.

The reaction product was recycled 30 times. The conversion of hydrolysis of olive oil was 60%.

EXAMPLE 7

A fermentation broth obtained by cultivating a strain belonging to the genus Corynebacterium and having an ω-oxidation activity was subjected to a ultrasonic wave treatment to break the cells, diluted two-fold with deionized water, placed in the same cylindrical vessel as used in Example 1, and maintained at 35° C. n-Decane was introduced into the vessel from the bottom thereof through a fabric of hemp in the form of oil droplets having a diameter of 0.3–0.5 mm and was allowed to rise at a space velocity of $4.5\times10^{-2} hr^{-1}$ to cause the ω-oxidation reaction. The reaction product, found floating on the top of the reaction mixture, was recycled. After the reaction product was recycled 10 times, the oxidized n-decane had an acid value of 15.

From the above description it is apparent that the stationary water-soluble phase can take various forms, in which the reactive component can be dissolved within the aqueous phase or be the aqueous phase itself.

Variations of the invention will be apparent to the skilled artisan without departing from the concept thereof. For example, the vessel containing the water-soluble component need not be vertically-positioned as long as top-to-bottom or bottom-to-top flow of the dispersed oil-soluble component can occur.

What is claimed is:

1. A method of carrying out a heterogeneous reaction, in the absence of an emulsifier, in which a water-soluble component is reacted with an oil-soluble component, the improvement which comprises, dispersing the oil-soluble component in the water-soluble component or in an aqueous medium containing the water-soluble component by passing the oil-soluble component through micropores of a disperser fabricated from a hydrophilic material as it enters the water-soluble component or the aqueous medium, aggregating the oil-soluble component after reaction, and separating the oil-soluble component from the water-soluble component or the aqueous medium containing said water-soluble component.

2. The method of heterogenous reaction as claimed in claim 1, wherein the disperser is fabricated in a form of a membrane, a gel, a plate, a constructed fabric or a non-woven fabric.

3. The method of heterogenous reaction as claimed in claim 1, wherein the aqueous medium is an aqueous solution of the water-soluble component.

4. The method of heterogeneous reaction as claimed in claim 1, wherein the micropores have a diameter of from 0.005 to 5 mm.

5. The method of hetergeneous reaction as claimed in claim 4, wherein the micropores have a diameter of from 0.01 to 1 mm.

6. The method of heterogeneous reaction as claimed in claim 1, wherein the hydrophilic material is a hydrophilic organic material, a hydrophilic inorganic material, a natural fiber or a manufactured fiber.

7. The method of heterogeneous reaction as claimed in claim 6, wherein said hydrophilic material is the hydrophilic organic material and is polyvinyl alcohol, polyvinyl formal, polyvinyl acetic acetal, polyvinyl acetal, cellulose, acetyl cellulose, nitro cellulose, acetyl butyl cellulose, ethyl cellulose, methyl cellulose, benzyl cellulose, polypeptide, agar, carrageenan, or gelatin.

8. The method of heterogeneous reaction as claimed in claim 6, wherein said hydrophilic material is the hydrophilic inorganic material and is glass, gypsum, cement, alumina, silica gel, or asbestos.

9. The method of hetergeneous reaction as claimed in claim 6, wherein said hydrophilic material is the natural fiber and is cotton, kapok, linen, ramine, jute, Manila hemp, sisal, New Zealand hemp, coir, mohair, cashmere, goat hair, camel hair, vicuna wool, alpaca hair, lama hair, horse hair or silk.

10. The method of hetergeneous reaction as claimed in claim 6, wherein said phydrophilic material is the manufactured fiber and is viscose rayon, cuprammonium rayon, or casein.

11. The method of heterogeneous reaction as claimed in claim 1, wherein the water-soluble component is water, methyl alcohol, ethyl alcohol, ethylene glycol, propylene glycol, glycerol, neopentyl polyol, sucrose, glucose or sorbitol.

12. The method of heterogeneous reaction as claimed in claim 1, wherein the oil-soluble component is an aliphatic carboxylic acid having at least 6 carbon atoms, an aliphatic hydrocarbon having at least 6 carbon atoms, an aromatic compound having at least 6 carbon atoms, natural animal or vegetable oils and fats, synthetic glycerides, or an ester.

13. The method of heterogeneous reaction as claimed in claim 12, wherein the ester is methyl oleate, methyl palmitate, ethyl stearate, oleyl oleate, sorbitan trioleate, or sucrose fatty acid ester.

14. The method of heterogeneous reaction as claimed in claim 1, wherein the water-soluble component or its aqueous solution and the oil-soluble component differ sufficiently in specific gravity so that the oil-soluble component will rise or fall through the water-soluble component or its aqueous solution.

15. The method of heterogeneous reaction as claimed in claim 14, wherein the water-soluble component or its aqueous solution is contained within a vessel and the oil-soluble component passes through the hydrophilic material positioned at the top or the bottom of the vessel.

16. The method of heterogeneous reaction as claimed in claim 14, wherein the resulting product is a liquid immiscible with the water-soluble component or its aqueous solution, or precipitates therein.

17. The method of heterogeneous reaction as claimed in claim 16, wherein the resulting product floats on the surface of the water-soluble component or its aqueous solution.

18. The method of heterogeneous reaction as claimed in claim 16, wherein the resulting product is recycled.

19. The method of heterogeneous reaction as claimed in claim 17, wherein the resulting product is recycled.

20. The method of heterogeneous reaction as claimed in claim 14, wherein the resulting product is recycled.

21. The method of heterogeneous reaction as claimed in claim 1 wherein the heterogeneous reaction is a biochemical reaction with an enzyme, in which said water-soluble component or said aqueous medium thereof contains an enzyme.

22. The method of heterogeneous biochemical reaction as claimed in claim 21, wherein the enzyme is a lipase or an enzyme of the genus Corynebacterium.

* * * * *